M. M. SPAULDING.
VALVE.
APPLICATION FILED NOV. 20, 1917.

1,332,639.

Patented Mar. 2, 1920.

WITNESSES
W. C. Fielding
Wm Zeaman

INVENTOR
Morton M. Spaulding

BY Richard Bowen.

ATTORNEY

UNITED STATES PATENT OFFICE.

MORTON M. SPAULDING, OF NORTH ADAMS, MASSACHUSETTS.

VALVE.

1,332,639. Specification of Letters Patent. Patented Mar. 2, 1920.

Application filed November 20, 1917. Serial No. 202,998.

*To all whom it may concern:*

Be it known that I, MORTON M. SPAULDING, a citizen of the United States, residing at North Adams, in the county of Berkshire and State of Massachusetts, have invented certain new and useful Improvements in Valves, of which the following is a specification.

This invention has relation to hydraulic valves for hydraulic presses, riveting machines, jacks or the like, and has for an object to provide a valve of a new construction whereby the parts are arranged so as to require only slight rotative movement of the valve to apply pressure to the hydraulic machine or to release pressure therefrom.

Another object of the invention is to provide a three-way hydraulic valve for the purpose above described embodying a turn plug mounted in a casing and having ports of different diameters for registration with ports of the casing.

A still further object of the invention is to provide a hydraulic valve embodying the characteristics above set forth which is simple in construction and which requires no packing to secure a tight joint between the movable parts of the valve.

In addition to the foregoing my invention comprehends improvements in the details of construction and arrangement of the correlative parts to be hereinafter more fully described and particularly set forth in the appended claim.

Figure 1:
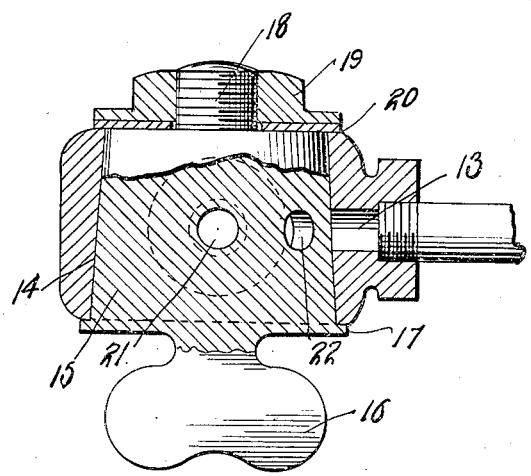
Figure 2:
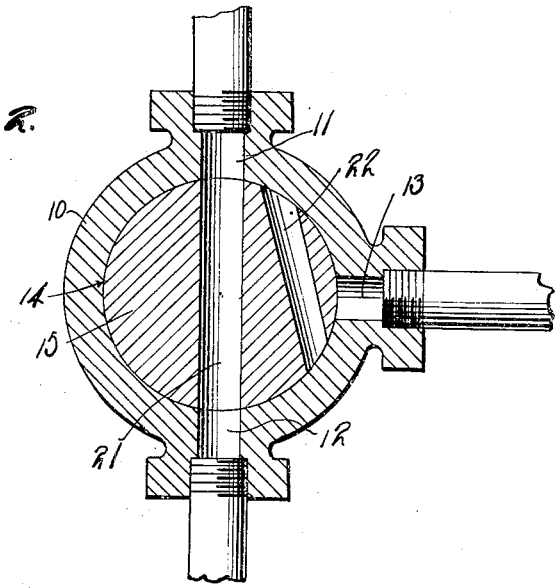

In the accompanying drawings in which similar and corresponding parts are designated by the same characters of reference throughout the several views in which they appear;

Figure 1, is a view in section of a hydraulic valve constructed in accordance with my invention, and Fig. 2, is a view in section taken at right angles to the plane of the preceding figure.

With reference to the drawings 10 indicates a circular casing provided with ports 11 and 12 at diametrically opposite points, and a port 13 at a point midway of the ports 11 and 12. The port 11 is designed to be connected to the cylinder of the hydraulic machine to be actuated, while the port 12 is connected to the pump or source of water pressure. The port 13 is connected to a pipe for carrying away the waste water.

The valve casing is formed with a central aperture 14 at right angles to the axis of the ports mentioned above, and extends entirely through the casing. The aperture 14 which forms a valve seat is conical tapering from one end of the valve to the other to receive a valve 15 which is tapered to the same extent, and is provided upon one end with an actuating handle 16. The end of the valve adjacent said handle is formed with a flange 17 to engage one end of the valve casing while the other end of the valve is reduced as at 18 and threaded to receive a nut 19, a washer 20 being interposed between the nut and the adjacent end of the casing whereby the valve may be tightly held in place by tightening up the nut.

The valve body 15 is formed with a diametrical passage 21 of a diameter corresponding to the diameter of the ports 11 and 12, and also with a passage 22 extending at an angle to the passage 21 and of a diameter slightly smaller than the passage 21.

In use, water pressure is directed to the hydraulic machine to be operated by disposing the valve body 15 in a position shown in Fig. 2, wherein the ports 11 and 12 are placed in communication by the alinement therewith of the passage 21 of the valve. It will be noted that in this position the passage 21 is lapped at each end by the valve casing, and the port 13 is also lapped by that portion of the valve body intermediate the ends of said passage 22. In order to release the pressure from the hydraulic machine, that is to permit the ram, plunger or the like to return to former position, said valve body is rotated so as to cause the passage 22 to span the ports 11 and 13, to establish the same in communication whereupon the waste water from the cylinder of the hydraulic machine can float through said port, the passage 22, and into the port 13. It will be noted that only slight rotative movement is necessary to move the valve from one position to the other thereby permitting the quick shutting off of the application of power to the hydraulic machine. It will also be obvious that by rotating the valve in an opposite direction all the ports may be lapped.

While I have illustrated and described my invention with some degree of particularity, I realize that in practice various alterations thereover may be made, and I therefore desire to reserve the right and privilege of changing the form of the details of construction, or otherwise altering the arrangement of the correlative parts without departing from the spirit of the invention or the scope of the appended claim.

Having thus described my invention what I claim as new and desire to secure by Letters Patent is:—

A hydraulic valve comprising a casing having diametrically opposite inlet and outlet ports with a relief port arranged midway between them and at right angles thereto, said casing having an opening extending therethrough at right angles to the above mentioned ports, a valve body fitting and rotatable in said opening and having a diametrical passage extending centrally therethrough for communicating the outlet and inlet ports, a second passage extending therethrough at an oblique angle to the first mentioned passage with one end positioned adjacent the outlet end of said diametrical passage and diverging from said passage with its other end so positioned as to allow for communicating the outlet and relief ports on a slight turning of the valve body.

In testimony whereof I affix my signature in presence of two witnesses.

MORTON M. SPAULDING.

Witnesses:
C. T. PHELPS,
WM. C. CLIFFORD.